(12) United States Patent
Barker et al.

(10) Patent No.: US 8,634,949 B2
(45) Date of Patent: Jan. 21, 2014

(54) MANUFACTURING MANAGEMENT USING TOOL OPERATING DATA

(75) Inventors: Brian C. Barker, Poughkeepsie, NY (US); Edward P. Higgins, Ripton, VT (US); Richard L. Kleinhenz, Wappingers Falls, NY (US); Gary R. Moore, Milton, VT (US); Mark L. Reath, Red Hook, NY (US); Justin W. Wong, South Burlington, VT (US); Horst Zisgen, Heidesheim (DE)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/783,736

(22) Filed: May 20, 2010

(65) Prior Publication Data

US 2011/0288668 A1     Nov. 24, 2011

(51) Int. Cl.
*G06F 19/00* (2011.01)
(52) U.S. Cl.
USPC ............................................. 700/99; 700/100
(58) Field of Classification Search
USPC ............... 700/97, 99, 100, 108, 121; 705/400
See application file for complete search history.

(56) References Cited

U.S. PATENT DOCUMENTS

| | | | | |
|---|---|---|---|---|
| 5,896,294 A * | 4/1999 | Chow et al. | ............ | 700/121 |
| 6,681,188 B2 * | 1/2004 | Sakurai et al. | .............. | 702/30 |
| 6,701,257 B2 * | 3/2004 | Sakurai et al. | .............. | 702/30 |
| 6,816,792 B2 * | 11/2004 | Sakurai et al. | .............. | 702/30 |
| 6,907,362 B2 | 6/2005 | Hasper | | |
| 6,909,996 B2 | 6/2005 | Huang et al. | | |
| 6,965,833 B2 * | 11/2005 | Sakurai et al. | .............. | 702/30 |
| 7,054,797 B2 * | 5/2006 | Kobayashi et al. | ............ | 703/2 |
| 7,072,028 B2 | 7/2006 | Powell et al. | | |
| 7,117,117 B2 * | 10/2006 | Sakurai et al. | ............ | 702/179 |
| 7,177,768 B2 * | 2/2007 | Sakurai et al. | .............. | 702/30 |
| 7,219,042 B2 * | 5/2007 | Kobayashi et al. | ............ | 703/6 |
| 7,243,032 B2 * | 7/2007 | Sakurai et al. | .............. | 702/30 |
| 7,353,118 B2 * | 4/2008 | Sakurai et al. | .............. | 702/22 |
| 7,511,814 B2 * | 3/2009 | Otsuki et al. | ............ | 356/338 |
| 7,515,264 B2 * | 4/2009 | Otsuki et al. | ............ | 356/338 |
| 7,667,840 B2 * | 2/2010 | Otsuki et al. | ............ | 356/338 |
| 7,707,085 B2 * | 4/2010 | Sakurai et al. | .............. | 705/35 |
| 7,931,945 B2 * | 4/2011 | Otsuki et al. | ............ | 427/576 |
| 7,970,483 B2 * | 6/2011 | Raoux et al. | ............ | 700/108 |
| 2002/0035406 A1 * | 3/2002 | Sakurai et al. | .............. | 700/90 |
| 2003/0065471 A1 * | 4/2003 | Tsuji et al. | ............ | 702/130 |
| 2004/0225413 A1 * | 11/2004 | Miyashita et al. | ............ | 700/291 |
| 2007/0260343 A1 * | 11/2007 | Raoux et al. | ............ | 700/95 |
| 2009/0018688 A1 * | 1/2009 | Chandler et al. | ............ | 700/105 |
| 2009/0047187 A1 * | 2/2009 | Suzuki et al. | ............ | 422/169 |
| 2009/0307037 A1 * | 12/2009 | King | ............ | 705/8 |

* cited by examiner

*Primary Examiner* — Charles Kasenge
(74) *Attorney, Agent, or Firm* — Richard Kotulak; Hoffman Warnick LLC

(57) ABSTRACT

A solution for managing a manufacturing environment using operating data for each of a plurality of tools in the manufacturing environment. The operating data can include actual resource consumption data and/or actual exhaust generation data for a tool while the tool implements at least a portion of a recipe to manufacture one of a plurality of types of products manufactured in the manufacturing environment. Operation of the manufacturing environment can be configured to optimize one or more aspects of resource consumption and/or exhaust generation during the manufacture of desired quantities of the plurality of types of products within a desired time frame using the operating data.

20 Claims, 3 Drawing Sheets

MANUFACTURING MANAGEMENT USING TOOL OPERATING DATA

TECHNICAL FIELD

The disclosure relates generally to managing a manufacturing environment, and more particularly, to managing the manufacturing environment using operating data, such as chemical and/or utility consumption data, for each tool in the manufacturing environment.

BACKGROUND

In a factory, such as a factory for producing integrated circuits, some tools used in the production process can include detection devices, such as a mass flow controller, flow meter, or spectrometer, to monitor chemical consumption within a process chamber of the tool during its use in producing a product, such as an integrated circuit. Patterns in the chemical consumption can be analyzed to indicate when to advance to a next step in the production process. Alternatively, the process can advance to the next step after a predetermined period of time. Additionally, data on the consumption of various resources can be output to a local database for processing, such as statistical analysis and fault detection with respect to the operation of the tool.

For factory-wide monitoring of resource consumption, e.g., to forecast material (e.g., chemical) usage and requirements, a current approach evaluates information regarding an amount of the material available in a material warehouse, an amount of the material provided for use in executing each of a plurality of recipes, and projected requirements for the material based on a production schedule for the factory. The projected requirements can be generated based on simulated material consumption for the factory, which can be refined over time by evaluating actual consumption by the factory with previously predicted consumption and making modifications, when necessary, to future predictions.

BRIEF SUMMARY

The inventors recognize that in current manufacturing environments, accounting for resource consumption, such as chemical inputs and utility consumption, and exhaust generation, such as chemical outputs and other manufacturing by-products, at the tool level can provide important information to enhance utilization of the manufacturing environment, environmental compliance, recipe management, cost reduction, profit/loss calculations, and/or the like, at the factory or multiple factory level. Currently, no solution exists to provide this type of detailed tool-specific operating data for use in configuring operation of the manufacturing environment, let alone provide such data in real-time.

Aspects of the invention provide a solution for managing a manufacturing environment using operating data for each of a plurality of tools in the manufacturing environment. The operating data can include actual resource consumption data and/or actual exhaust generation data for a tool while the tool implements at least a portion of a recipe to manufacture one of a plurality of types of products manufactured in the manufacturing environment. Operation of the manufacturing environment can be configured to optimize one or more aspects of resource consumption and/or exhaust generation during the manufacture of desired quantities of the plurality of types of products within a desired time frame using the operating data. For example, operation of the manufacturing environment can be configured to optimize the total cost of the associated purchase costs of the consumed resources and/or the associated waste management costs of the generated exhaust.

A first aspect of the invention provides a computer-implemented method of managing a manufacturing environment, the method comprising: acquiring operating data for each of a plurality of tools in the manufacturing environment on a computer system, the operating data for a tool including actual resource consumption data for a set of resources and actual exhaust generation data for a set of exhaust materials while the tool implements at least a portion of a recipe to manufacture one of a plurality of types of products manufactured in the manufacturing environment; and configuring operation of the manufacturing environment using the computer system to optimize at least one of: consumption of a set of resources or generation of the set of exhaust materials during the manufacture of desired quantities of the plurality of types of products within a desired time frame using the operating data.

A second aspect of the invention provides a computer system comprising: a set of computing devices configured to implement a method of managing a manufacturing environment, the method including: acquiring operating data for each of a plurality of tools in the manufacturing environment, the operating data for a tool including actual resource consumption data for a set of resources and actual exhaust generation data for a set of exhaust materials while the tool implements at least a portion of a recipe to manufacture one of a plurality of types of products manufactured in the manufacturing environment; and configuring operation of the manufacturing environment to optimize at least one of: consumption of the set of resources or generation of the set of exhaust materials during the manufacture of desired quantities of the plurality of types of products within a desired time frame using the operating data.

A third aspect of the invention provides a computer program comprising program code embodied in at least one computer-readable storage medium, which when executed, enables a computer system to implement a method of managing a manufacturing environment, the method comprising: acquiring operating data for each of a plurality of tools in the manufacturing environment, the operating data for a tool including actual resource consumption data for a set of resources and actual exhaust generation data for a set of exhaust materials while the tool implements at least a portion of a recipe to manufacture one of a plurality of types of products manufactured in the manufacturing environment; and configuring operation of the manufacturing environment to optimize at least one of: consumption of the set of resources or generation of the set of exhaust materials during the manufacture of desired quantities of the plurality of types of products within a desired time frame using the operating data.

A fourth aspect of the invention provides a method of generating a computer system for managing a manufacturing environment, the method comprising: providing a computer system operable to implement a method including: acquiring operating data for each of a plurality of tools in the manufacturing environment, the operating data for a tool including actual resource consumption data for a set of resources and actual exhaust generation data for a set of exhaust materials while the tool implements at least a portion of a recipe to manufacture one of a plurality of types of products manufactured in the manufacturing environment; and configuring operation of the manufacturing environment to optimize at least one of: consumption of the set of resources or generation of the set of exhaust materials during the manufacture of desired quantities of the plurality of types of products within a desired time frame using the operating data.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE SEVERAL VIEWS OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

As indicated above, aspects of the invention provide a solution for managing manufacturing environment using operating data for each of a plurality of tools in the manufacturing environment. The operating data can include actual resource consumption data and/or actual exhaust generation data for a tool while the tool implements at least a portion of a recipe to manufacture one of a plurality of types of products manufactured in the manufacturing environment. Operation of the manufacturing environment can be configured to optimize one or more aspects of resource consumption and/or exhaust generation during the manufacture of desired quantities of the plurality of types of products within a desired time frame using the operating data. For example, operation of the manufacturing environment can be configured to optimize the total cost of the associated purchase costs of the consumed resources and/or the associated waste management costs of the generated exhaust. As used herein, unless otherwise noted, the term "set" means one or more (i.e., at least one) and the phrase "any solution" means any now known or later developed solution.

Figure 1:
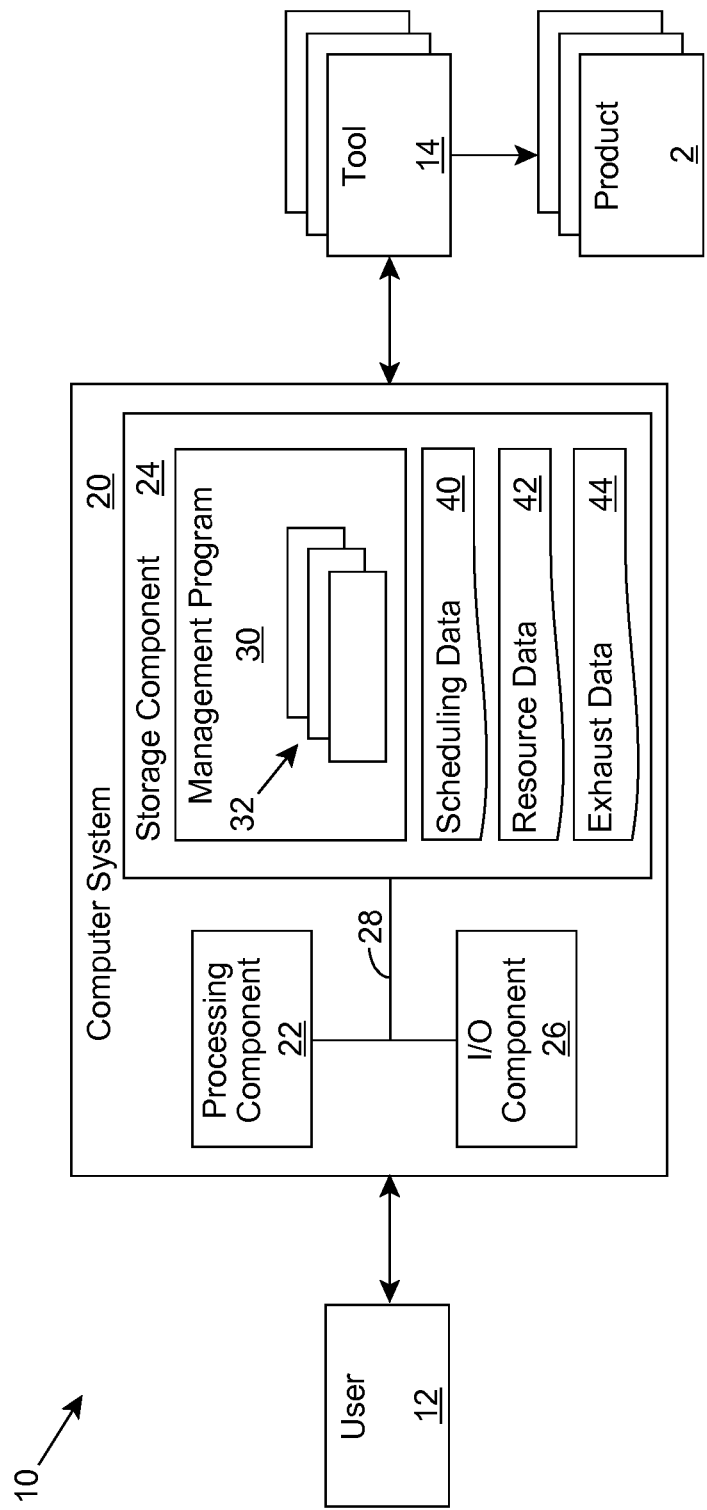
FIG. 1 shows an illustrative manufacturing environment according to an embodiment.

Turning to the drawings, FIG. 1 shows an illustrative manufacturing environment 10 according to an embodiment. To this extent, environment 10 includes a computer system 20 that can perform a process described herein in order to manage the manufacture of one or more products 2 using various tools 14. In particular, computer system 20 is shown including a management program 30, which makes computer system 20 operable to manage the operation of the manufacturing environment 10 by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as management program 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, management program 30 can manage a set of interfaces (e.g., graphical user interface(s), application program interface, and/or the like) that enable human and/or system users 12 to interact with management program 30. Further, management program 30 can manage (e.g., store, retrieve, create, manipulate, organize, present, etc.) the data, such as scheduling data 40, using any solution.

In any event, computer system 20 can comprise one or more general purpose computing articles of manufacture (e.g., computing devices) capable of executing program code, such as management program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, management program 30 can be embodied as any combination of system software and/or application software.

Furthermore, management program 30 can be implemented using a set of modules 32. In this case, a module 32 can enable computer system 20 to perform a set of tasks used by management program 30, and can be separately developed and/or implemented apart from other portions of management program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of computer system 20.

When computer system 20 comprises multiple computing devices, each computing device can have only a portion of management program 30 fixed thereon (e.g., one or more modules 32). However, it is understood that computer system 20 and management program 30 are only representative of various possible equivalent computer systems that may perform a process described herein. To this extent, in other embodiments, the functionality provided by computer system 20 and management program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Additionally, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, management program 30 enables computer system 20 to manage the operation of manufacturing environment 10 using actual operating data, such as resource consumption and exhaust generation data, for the various tools 14. To this extent, computer system 20 can process scheduling data 40 for the manufacturing environment 10. Scheduling data 40 can include a schedule for the utilization of each tool 14 in manufacturing environment 10 in the manufacture of a desired quantity of one or more types of products 2 within a desired timeframe. To this extent, computer system 20 can generate scheduling data 40 based on the desired quantity of each of a plurality of types of products 2 to be manufactured, a corresponding timeframe for each desired quantity, an operating status of each of the set of tools 14, and/or the like.

Each type of product 2 can comprise a corresponding recipe that is utilized to manufacture the type of product 2. It is understood that product 2 can comprise a final product ready for use/further processing outside of manufacturing environment 10 or an intermediate product that requires additional processing within manufacturing environment 10. To this extent, computer system 20 can generate the scheduling data 40 to allocate the set of tools 14 in the manufacturing environment 10 in order to perform the various recipes required to manufacture the corresponding desired quantities of the types of products 2 within the desired timeframe. Additionally, once scheduling data 40 for a given timeframe is complete, computer system 20 can operate the set of tools 14 and other components within the manufacturing environment 10 according to the scheduling data 40 and corresponding recipes.

Each recipe can include a plurality of recipe steps. A recipe step can require a particular type of tool 14 for a particular amount of time. Additionally, a recipe step can consume a set of resources and generate exhaust, which can include a set of by-products, during the performance of the recipe step. As used herein, the term "resource" means any material (e.g., raw matter, gas, liquid, etc.), time, energy, a set of tools 14, manpower, and/or the like, which is provided in order to manufacture a product 2. Some or all of each resource is consumed by one or more tools 14 to create the product 2. As used herein, the term "exhaust" means any undesired (with respect to the particular product 2) material generated (e.g., a by-product), any material provided but not included in product 2, or the like, during the manufacture of the product 2.

As described herein, computer system 20 can further account for operating data, including resource consumption and exhaust generation, in generating scheduling data 40. To this extent, computer system 20 can acquire operating data for each tool 14 in the manufacturing environment 10. The operating data can include resource data 42 and exhaust data 44 for the implementation of various recipe steps for each of the various recipes implemented within manufacturing environment 10. Resource data 42 and exhaust data 44 can be collected for each unique tool 14 within the manufacturing environment 10. Due to variations in the tools 14, resource data 42 and/or exhaust data 44 for the same recipe and/or the same recipe step can vary based on the particular tool 14 used to implement the recipe/recipe step. Additionally, resource data 42 and exhaust data 44 can include additional tool 14 independent resource/exhaust information. For example, resource data 42 can include a cost of purchasing a resource, exhaust data 44 can include a cost of processing a waste material (e.g., a by-product), and/or the like.

Figure 2:
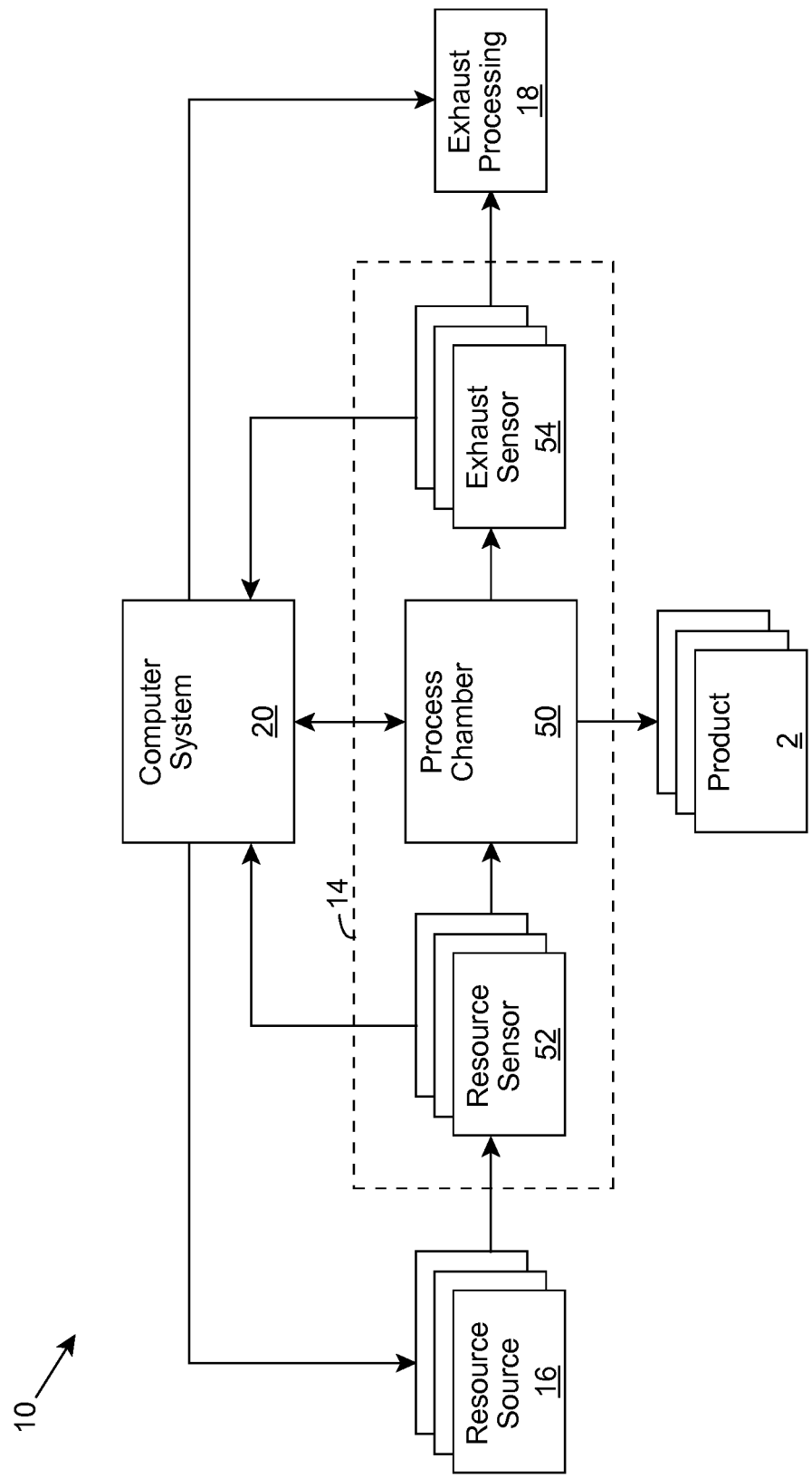
FIG. 2 shows a more detailed view of operation of a portion of an illustrative manufacturing environment according to an embodiment.

FIG. 2 shows a more detailed view of operation of a portion of manufacturing environment 10 according to an embodiment. As illustrated, computer system 20 can operate one or more resource sources 16 to provide the required resources to a tool 14 during the manufacture of a product 2. For example, computer system 20 can direct a resource source 16 to provide a desired volume, quantity, flow rate, and/or the like, of a corresponding resource for use within the process chamber 50 of the tool 14. Tool 14 can include one or more resource sensors 52, each of which monitors the actual volume, quantity, flow rate, and/or the like, of a corresponding resource that is provided to the process chamber 50. A resource sensor 52 can provide resource data 42 (FIG. 1) corresponding to the resource provided to process chamber 50 periodically or continuously using any solution.

Similarly, computer system 20 can operate and receive operating data for process chamber 50. For example, computer system 20 can designate a temperature, a pressure, and/or the like, to be maintained within process chamber 50 during the implementation of a recipe/recipe step to generate product 2, and can receive operating data indicating the actual temperature, pressure, and/or the like, within process chamber 50. Furthermore, the operating data for process chamber 50 can include additional resource data 42, such as an amount of power consumed, and/or the like.

Additionally, tool 14 can include one or more exhaust sensors 54, each of which monitors the volume, quantity, flow rate, and/or the like, of a corresponding material (e.g., excess, remnant, by-product, or the like) that is output from the process chamber 50 as a result of manufacturing the product 2. An exhaust sensor 54 can provide exhaust data 44 (FIG. 1) corresponding to a particular material output from process chamber 50 periodically or continuously using any solution. Computer system 20 can further operate one or more exhaust processing systems 18 based on the exhaust data acquired from the set of exhaust sensors 54. An exhaust processing system 18 can process some or all of the materials output by process chamber 50 to sequester, break down, purge, or the like, a material from the exhaust output from process chamber 50, vent the exhaust output from process chamber 50, and/or the like.

Computer system 20 can use the operating data, including resource data 42 and exhaust data 44, to: operate resource sources 16, tool 14, and/or exhaust processing system 18; and/or confirm proper operation of resource sources 16, tool 14, and/or exhaust processing system 18. For example, computer system 20 can determine when to move to a next step in a recipe based on the operating data. Similarly, computer system 20 can determine that one or more components (e.g., tool 14) is not operating properly based on the operating data and halt further operation of the various components in the manufacture of a product 2.

Computer system 20 also can use the operating data (including resource data 42 and/or exhaust data 44) to configure operation of the manufacturing environment 10 to optimize one or more aspects of resource consumption, exhaust generation, and/or the like, during the manufacture of various types of products. For example, computer system 20 can use the operating data when generating scheduling data 40 to provide efficient use of one or more types of resources, reduce the generation of one or more types of exhaust materials, and/or the like, when performing the manufacturing. Similarly, computer system 20 can use the operating data to optimize the costs associated with the resource consumption (e.g., total purchase costs of the consumed resources) and/or associated with the exhaust generation (e.g., total waste management costs of the generated exhaust). In this manner, the cost, environmental impact, and/or the like, of operating manufacturing environment 10 can be reduced. For example, an amount of resources that need to be purchased can be reduced, an amount of utilities that are consumed can be reduced, an amount of exhaust generated can be reduced, environmental compliance fees can be reduced, a cost of the resources consumed can be reduced, a cost of waste management (e.g., disposal) of the exhaust generated can be reduced, and/or the like.

Figure 3:
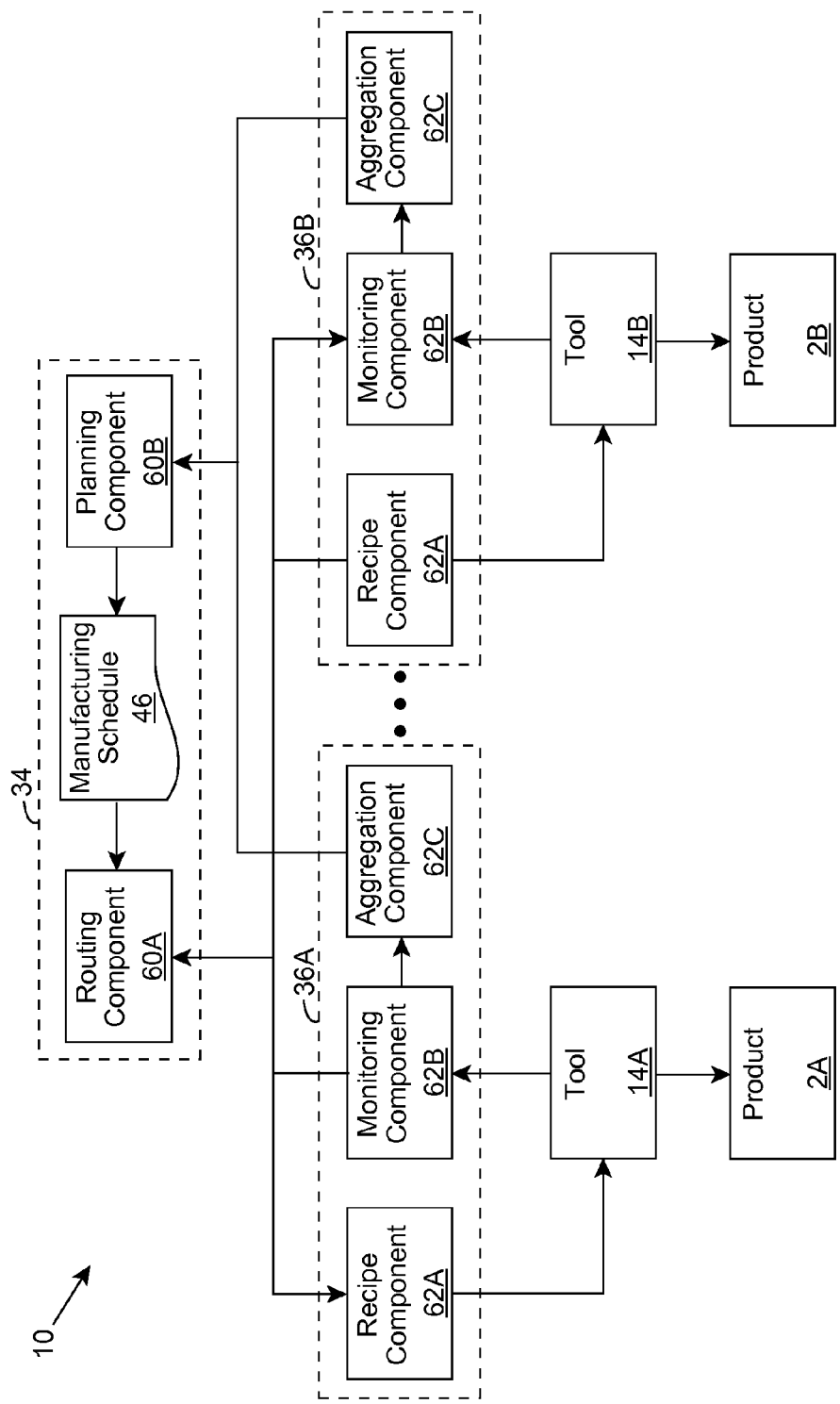
FIG. 3 shows an illustrative manufacturing environment according to another embodiment.

FIG. 3 shows an illustrative manufacturing environment 10 according to another embodiment. In environment 10, computer system 20 (FIG. 1) is implemented using a manufacturing execution system 34 and multiple tool management systems 36A, 36B. In an embodiment, manufacturing execution system 34 comprise one or more computing devices, while each tool management system 36A, 36B is implemented using a unique computing device. The manufacturing execution system 34 can be configured to perform all of the higher level management actions (e.g., scheduling, routing, planning, etc.) for the entire manufacturing environment 10. Each tool management system 36A, 36B can be configured to perform tool-specific management actions (e.g., recipe execution, process monitoring, historical performance data management, etc.). To this extent, each tool 14A, 14B in manufacturing environment 10 can comprise a localized tool management system 36A, 36B, which can be implemented in a one-to-one relationship.

In operation, a routing component 60A of manufacturing execution system 34 can process a manufacturing schedule 46 that identifies the desired quantities and time frames for various types of products to be manufactured by manufacturing environment 10. Routing component 60A can route resources (e.g., raw materials, intermediate products, and/or the like) to various tools 14A, 14B for processing by the corresponding tools 14A, 14B according to the manufacturing schedule 46. Additionally, routing component 60A can determine the appropriate routing based on tool availability, capacity restrictions, resource availability, and/or the like. Furthermore, routing component 60A can determine the appropriate routing based on historic operating data, such as resource consumption and exhaust generation data, for the available tools 14A, 14B. Regardless, once routing component 60A identifies an available tool 14A, 14B to implement a recipe for manufacturing a product 2A, 2B, routing component 60A can provide the corresponding recipe to be implemented by the tool 14A, 14B to a recipe component 62A of the tool management system 36A, 36B corresponding to the tool 14A, 14B.

Once the required resources are available, e.g., from a corresponding resource source 16 (FIG. 2), each recipe component 62A can operate a corresponding tool 14A, 14B according to the recipe received from routing component 60A in order to manufacture one or more products 2A, 2B, respectively. For example, recipe component 62A can adjust one or more conditions within a process chamber 50 (FIG. 2) of the corresponding tool 14A, 14B according to a recipe step, monitor elapsed time, resource amounts, and/or the like, to determine when to proceed to a next step in the recipe, determine when the recipe has completed, and/or the like. Furthermore, while not shown in FIG. 3, recipe component 62A can operate one or more resource sources 16 according to a recipe step to provide the necessary resource(s) to the process chamber 50.

During execution of the recipe, monitoring component 62B can receive and process operating data to monitor one or more aspects of the operation of the corresponding tool 14A, 14B in real time. For example, monitoring component 62B can acquire an equipment trace comprising real time operating data corresponding to the actual resource consumption and actual exhaust generation by the corresponding tool 14A, 14B during the execution of the recipe. The actual resource consumption data can comprise data corresponding to the consumption by/flow rates into the process chamber 50 of one or more materials (e.g., chemicals, gases, liquids, or the like), utility usage, and/or the like. In an embodiment, such data is acquired and provided to monitoring component 62B by one or more resource sensors 52 (FIG. 2) of the corresponding tool 14A, 14B. Similarly, the actual exhaust generation data can comprise data corresponding to the composition of exhaust (e.g., presence/concentration of one or more chemicals), the generation of one or more by-products, and/or the like. In an embodiment, such data is acquired and provided to monitoring component 62B by one or more exhaust sensors 54 (FIG. 2) of the corresponding tool 14A, 14B.

Monitoring component 62B can process the actual operating data, such as the resource data 42 (FIG. 1) and exhaust data 44 (FIG. 1), using statistical analysis, fault detection algorithms, and/or the like, in real-time to determine whether the tool 14A, 14B is operating properly during the manufacture of a corresponding product 2A, 2B according to the recipe. To this extent, monitoring component 62B can record real time actual resource consumption data and actual exhaust data that is mapped to a corresponding step/operation of the recipe being executed by the tool 14A, 14B. In this manner, monitoring component 62B can determine whether the tool 14A, 14B properly performed the step. For example, monitoring component 62B can determine whether each of one or more of the values for the operating data are within an acceptable range of a target value as defined by the recipe/recipe step. Depending on any variance found, monitoring component 62B can determine that the step was performed properly, may or may not have been performed properly, or was not performed properly, and generate and provide a corresponding message for processing by manufacturing execution system 34.

Additionally, monitoring component 62B can evaluate the operating data, such as the actual resource consumption data and actual exhaust generation data, with historical values for the operating data for the corresponding tool 14A, 14B implementing the step to determine whether the data are within desired tolerances. For example, monitoring component 62B can determine whether the operating data for the corresponding tool 14A, 14B is within a desired tolerance of an average of a predetermined number of the most recent previous executions of the recipe/recipe step. If one or more data items are outside of a desired tolerance, monitoring component 62B can generate and provide a corresponding message for processing by manufacturing execution system 34, halt the execution of the recipe by recipe component 62A and the corresponding tool 14A, 14B, and/or the like. Moreover, if a message indicates an error signaling that the corresponding tool 14A, 14B is malfunctioning, routing component 60A can make the tool 14A, 14B unavailable, and adjust the manufacturing schedule 46 accordingly.

Each tool management system 36A, 36B is further shown including an aggregation component 62C. Aggregation component 62C can collect some or all of the operating data (e.g., the actual resource consumption data and actual exhaust generation data) for a particular recipe/recipe step and provide the data for processing by a planning component 60B shown implemented within manufacturing execution system 34. In an embodiment, aggregation component 62C collects and provides the operating data in real-time. In general, planning component 60B is configured to enable a user 12 (FIG. 1) to perform various planning operations with respect to the operation of manufacturing environment 10.

To this extent, planning component 60B can generate and provide various interfaces that enable a user 12 to view and/or process one or more aspects of the real-time operation of manufacturing environment 10. For example, planning component 60B can provide summary data of the actual amounts of a resource that has been consumed, a by-product that has been generated, and/or the like by the manufacturing environment 10 over a given time period (e.g., day, week, month, etc.). Such an interface can enable the user 12 to "drill down" in the data to obtain data by the type of product 2A, 2B, type of tool 14A, 14B, particular tool 14A, 14B, and/or the like.

Additionally, planning component 60B can be configured to generate the manufacturing schedule 46, which is implemented by routing component 60A. In particular, planning component 60B can obtain the desired quantities of each of a plurality of types of products to be manufactured within a desired time frame, an availability of the various tools 14A, 14B, resources, and/or the like, and generate the manufacturing schedule 46 accordingly.

Planning component 60B also can use the operating data to examine real world "what if" scenarios needed to optimize the manufacturing schedule 46. For example, planning component 60B can process the operating data for each of the various tools 14A, 14B to generate the manufacturing schedule 46. In this manner, planning component 60B can enable manufacturing environment 10 planning based on cost of ownership, factory efficiency, and/or other industrial management solutions. To this extent, planning component 60B can adjust one or more aspects of the manufacturing schedule 46 according to detailed actual operating data for each tool 14A, 14B in the manufacturing environment 10. Furthermore, planning component 60B can generate a manufacturing schedule 46 that optimizes one or more variables in the operating data during operation of the entire manufacturing environment 10. For example, planning component 60B can generate a manufacturing schedule 46 that optimizes resource consumption and/or exhaust generation during the manufacture of the various products using the manufacturing environment 10. Subsequently, routing component 60A can operate the manufacturing environment 10 according to the manufacturing schedule 46.

In an embodiment, planning component 60B generates a manufacturing schedule 46 that optimizes a cost of operating the manufacturing environment 10 during a desired time frame. For example, planning component 60B can use cost data corresponding to one or more variables included in the operating data. Subsequently, planning component 60B can generate a manufacturing schedule 46 that minimizes the total cost of operating the manufacturing environment 10 as defined by the cost data corresponding to the one or more variables in the operating data. In a more particular example, the operating data can include data corresponding to various aspects of operation by each tool 14A, 14B in performing a particular recipe step, such as, for example: an amount of electricity; an amount of a material (e.g., chemical) consumed; an amount of a by-product generated; and/or the like.

Planning component 60B can obtain a corresponding cost for each of the variables, such as, for example: a cost of electricity; a cost of the material; a cost of generating the by-product (e.g., a regulatory charge, disposal cost, and/or the like); and/or the like, which can be included in the operating data. Subsequently, planning component 60B can use the cost and tool-specific operating data to minimize the total costs using any minimization function. For example, planning component 60B can select a more efficient tool to perform some or all of a recipe in generating the manufacturing schedule 46. In this manner, planning component 60B can take advantage of selective routing options between the different tools 14A, 14B to reduce the overall cost of manufacturing the products 2A, 2B. Additionally, planning component 60B can generate a manufacturing schedule 46 that is intended to maintain the total consumption of a resource and/or generation of a by-product within a limit (e.g., daily limit, monthly quota, or the like) so that a penalty fee, or the like, is not imposed by a government agency as a result of the operation of manufacturing environment 10 and provide evidence of compliance to prescribed limits/quotas.

More particularly, planning component 60B can obtain a set of resources consumed for a given recipe/recipe step and/or a set of exhaust materials generated for the given recipe/recipe step. Planning component 60B can determine the associated cost of consuming the set of resources and/or generating the set of exhaust materials to determine an associated consumption cost and/or exhaust treatment cost. Planning component 60B can use a weighted combination of the consumption/exhaust treatment costs to determine a corresponding cost of the recipe/recipe step. Planning component 60B can determine the associated cost based on an average performance of the recipe (e.g., regardless of the tool(s) used to perform the recipe) and/or determine the costs associated with various tool/route-specific performances of the recipe. In the latter case, planning component 60B can use the tool/route-specific recipe/recipe step costs to generate a manufacturing schedule 46 that minimizes one or more aspects (e.g., cost of consumption, cost of exhaust treatment, and/or the like) of the overall cost of performing the recipe, e.g., by selecting a more efficient tool 14A, 14B and/or route from various alternative options that is available to perform some or all of the recipe.

Furthermore, planning component 60B can evaluate one or more aspects (e.g., chemical consumption and/or associated costs) of the manufacture of a product using manufacturing environment 10 based on a technology (e.g., product family), a particular type of product, a manufacturing operation (e.g., recipe step), and/or the like. In an embodiment, planning component 60B can evaluate a cost of a recipe for manufacturing a type of product. For example, planning component 60B can consolidate the cost of each recipe step of the recipe using the operating data, such as the actual resource consumption and exhaust data, and the corresponding cost data to determine a total cost of the recipe. Planning component 60B can determine the associated cost based on an average performance of the recipe (e.g., regardless of the tool(s) used to perform the recipe) and/or determine the costs associated with various tool/route-specific performances of the recipe, the latter of which can be used to reduce one or more aspects of the costs of manufacturing the product by selecting a less costly tool/route as indicated by the associated costs.

Similarly, planning component 60B can evaluate a cost impact due to a proposed modification to an existing recipe to determine what impact, if any, the modification will have on the cost of manufacturing the type of product using the modified recipe. For example, planning component 60B can evaluate a change to a recipe that requires more of a less costly resource, but less of a more costly resource. Similarly, planning component 60B can evaluate a cost of an entirely new recipe, e.g., for manufacturing a new type of product 2A, 2B, using manufacturing environment 10. In either case, planning component 60B can evaluate the modification/new recipe step by consolidating actual operating data for one or more comparable recipe steps of various recipes with the corresponding cost data to evaluate what impact the proposed modification will have on the overall cost of manufacturing the type of product or the total cost that the new recipe will incur. Alternatively, planning component 60B can project the operating data of a modified step by curve fitting various actual data points acquired from the comparable recipe steps.

In another embodiment, planning component 60B can use the operating data of the tools 14A, 14B to evaluate an environmental impact corresponding to the manufacturing of a type of product using manufacturing environment 10. For example, planning component 60B can consolidate the actual resource consumption data and/or exhaust data that resulted by performing each of a plurality of recipe steps in a recipe using a particular set of tools 14A, 14B and/or route used within the manufacturing environment 10. The total resource consumption and/or exhaust generation can be used to evaluate the environmental impact of manufacturing the product 2A, 2B using the set of tools 14A, 14B/route. The consumption/generation of any substance, e.g., a toxic substance, can be used to evaluate the environmental impact. Illustrative substances can include, for example, carbon dioxide, hydrofluoric acid, arsenic, and/or the like.

In another embodiment, planning component 60B can determine an amount of each of a set of materials, such as one or more chemicals, included in a product 2A, 2B manufactured using a selected set of tools 14A, 14B/route within manufacturing environment 10. For example, planning component 60B can calculate the amount of a particular material in a product 2A, 2B by subtracting a measured amount of the material leaving a process chamber 50 (FIG. 2), e.g., with an exhaust sensor 54 (FIG. 2), from a measured amount of the material entering the process chamber 50, e.g., with a resource sensor 52 (FIG. 2), of a particular tool 14A, 14B. For a more accurate material composition of the product 2A, 2B, an amount of the material that remains in the process chamber 50 of the tool 14A, 14B after the manufacture of the product 2A, 2B also can be measured and subtracted. The material composition of the product 2A, 2B can be used in determining the proper shipping requirements and/or disposing requirements for the product 2A, 2B. For example, an amount of lead included in the product 2A, 2B can be used to determine shipping/disposing requirements for the product 2A, 2B.

While shown and described herein as a method and system for managing a manufacturing environment, it is understood that aspects of the invention further provide various alternative embodiments. For example, in one embodiment, the invention provides a solution for generating a manufacturing schedule that minimizes one or more aspects of resource consumption and/or exhaust generation, such as the total cost, using actual operating data of various tools 14A, 14B in a manufacturing environment 10. For example, generation of the manufacturing schedule can include the selection of tools 14A, 14B and/or routes within the manufacturing environment 10 that minimize the total cost of manufacturing the various products 2A, 2B with manufacturing environment 10.

In another embodiment, the invention provides a computer program fixed in at least one computer-readable medium, which when executed, enables a computer system to manage a manufacturing environment. To this extent, the computer-readable medium includes program code, such as management program 30 (FIG. 1), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In still another embodiment, the invention provides a method of providing a copy of program code, such as management program 30 (FIG. 1), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for managing a manufacturing environment. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of managing a manufacturing environment, the method comprising:
using at least one computing device to acquire real-time operating data for each of a plurality of tools in the manufacturing environment, each tool performing a portion of a recipe within a process chamber,
wherein the operating data for a tool includes actual resource consumption data for a set of resources used by the portion of the recipe and actual exhaust generation data for a set of exhaust materials exhausted by the portion of the recipe, and
wherein the recipe comprises a plurality of recipe steps implemented by the plurality of tools for creating one of a plurality of types of products created in the manufacturing environment;
using the at least one computing device to configure operation of the manufacturing environment to optimize at least one of: consumption of the set of resources or generation of the set of exhaust materials during the creation of desired quantities of the plurality of types of products within a desired time frame using the operating data, wherein the configuring includes evaluating a cost of a recipe for manufacturing type of product by consolidating the actual resource consumption data and the actual exhaust generation data for the plurality of recipe steps in the recipe; and using the at least one computing device to generate a manufacturing schedule based on the optimized operation of the manufacturing environment and at least one of a desired quantity of a product to be manufactured in the manufacturing environment in a time frame, and an availability of each tool in the plurality of tools that performs a portion of the recipe for the product.

2. The method of claim 1, wherein the configuring includes optimizing a cost associated with the at least one of: consumption of the set of resources or generation of the set of exhaust materials due to operating the manufacturing environment during the desired time frame.

3. The method of claim 1, wherein the configuring includes evaluating a cost impact due to at least one of: a modification to the recipe or a selected set of tools for performing the recipe using the consolidated data for the recipe and the cost of the recipe.

4. The method of claim 1, wherein the acquiring includes:
acquiring the actual resource consumption data and exhaust generation data from an equipment trace acquired by a tool management system for the corresponding tool; and
correlating the actual resource consumption data and exhaust generation data with recipe step data stored on a manufacturing execution system for the manufacturing environment, the recipe step data corresponding to a recipe step for a type of product.

5. The method of claim 1, further comprising evaluating an environmental impact corresponding to the manufacturing of a type of product by consolidating the actual resource consumption data and exhaust generation data for the plurality of recipe steps in the recipe.

6. The method of claim 1, further comprising determining a chemical makeup of a product using the actual resource consumption data and exhaust generation data for the plurality of recipe steps in the recipe, wherein the product comprises an integrated circuit.

7. A computer system comprising:
a set of computing devices configured to implement a method of managing a manufacturing environment, the method including:
acquiring real-time operating data for each of a plurality of tools in the manufacturing environment, each tool performing a portion of a recipe within a process chamber, wherein the operating data for a tool includes actual resource consumption data for a set of resources used by the portion of the recipe and actual exhaust generation data for a set of exhaust materials exhausted by the portion of the recipe, and
wherein the recipe comprises a plurality of recipe steps implemented by the plurality of tools for creating one of a plurality of types of products created in the manufacturing environment;
configuring operation of the manufacturing environment to optimize at least one of: consumption of the set of resources or generation of the set of exhaust materials during the creation of desired quantities of the plurality of types of products within a desired time frame using the operating data, wherein the configuring includes evaluating a cost of a recipe for manufacturing a type of product by consolidating the actual resource consumption data and the actual exhaust generation data for the plurality of recipe steps in the recipe; and generating a manufacturing schedule based on the optimized operation of the manufacturing environment and at least one of a desired quantity of a product to be manufactured in the manufacturing environment in a time frame, and an availability of each tool in the plurality of tools that performs a portion of the recipe for the product.

8. The system of claim 7, wherein the configuring includes optimizing a cost associated with the at least one of: consumption of the set of resources or generation of the set of exhaust materials due to operating the manufacturing environment during the desired time frame.

9. The system of claim 7, wherein the configuring includes evaluating a cost impact due to at least one of: a modification to the recipe or a selected set of tools for performing the recipe using the consolidated data for the recipe and the cost of the recipe.

10. The system of claim 7, wherein the acquiring includes:
acquiring the actual resource consumption data and exhaust generation data from an equipment trace acquired by a tool management system for the corresponding tool; and
correlating the actual resource consumption data and exhaust generation data with recipe step data stored on a manufacturing execution system for the manufacturing environment, the recipe step data corresponding to a recipe step for a type of product.

11. The system of claim 7, the method further including evaluating an environmental impact corresponding to the manufacturing of a type of product by consolidating the actual resource consumption data and exhaust generation data for the plurality of recipe steps in the recipe.

12. The system of claim 7, the method further including determining a chemical makeup of a product using the actual resource consumption data and exhaust generation data for the plurality of recipe steps in the recipe, wherein the product comprises an integrated circuit.

13. A computer program comprising program code embodied in at least one computer-readable storage medium, which when executed, enables a computer system to implement a method of managing a manufacturing environment, the method comprising:
acquiring real-time operating data for each of a plurality of tools in the manufacturing environment, each tool performing a portion of a recipe within a process chamber, wherein the operating data for a tool includes actual resource consumption data for a set of resources used by the portion of the recipe and actual exhaust generation data for a set of exhaust materials exhausted by the portion of the recipe, and
wherein the recipe comprises a plurality of recipe steps implemented by the plurality of tools for creating one of a plurality of types of products created in the manufacturing environment;
configuring operation of the manufacturing environment to optimize at least one of: consumption of the set of resources or generation of the set of exhaust materials during the creation of desired quantities of the plurality of types of products within a desired time frame using the operating data,
wherein the configuring includes evaluating a cost of a recipe for manufacturing a type of product by consolidating the actual resource consumption data and the actual exhaust generation data for the plurality of recipe steps in the recipe; and
generating a manufacturing schedule based on the optimized operation of the manufacturing environment and at least one of a desired quantity of a product to be manufactured in the manufacturing environment in a time frame, and an availability of each tool in the plurality of tools that performs a portion of the recipe for the product.

14. The computer program of claim 13, wherein the configuring includes optimizing a cost associated with the at least one of: consumption of the set of resources or generation of the set of exhaust materials due to operating the manufacturing environment during the desired time frame.

15. The computer program of claim 13, wherein the acquiring includes:
acquiring the actual resource consumption data and exhaust generation data from an equipment trace acquired by a tool management system for the corresponding tool; and
correlating the actual resource consumption data and exhaust generation data with recipe step data stored on a manufacturing execution system for the manufacturing environment, the recipe step data corresponding to a recipe step for a type of product.

16. The computer program of claim 13, the method further including evaluating an environmental impact corresponding to the manufacturing of a type of product by consolidating the actual resource consumption data and exhaust generation data for the plurality of recipe steps in the recipe.

17. The computer program of claim 13, wherein the configuring includes evaluating a cost impact due to at least one of: a modification to the recipe or a selected set of tools for performing the recipe using the consolidated data for the recipe and the cost of the recipe.

18. A method of generating a computing device for managing a manufacturing environment, the method comprising:
providing a computing device including a memory and a processing unit for executing a program stored in the memory, the computing device being operable to implement a method including:
acquiring real-time operating data for each of a plurality of tools in the manufacturing environment, each tool performing a portion of a recipe within a process chamber,
wherein the operating data for a tool includes actual resource consumption data for a set of resources used by the portion of the recipe and actual exhaust generation data for a set of exhaust materials exhausted by the portion of the recipe, and
wherein the recipe comprises a plurality of recipe steps implemented by the plurality of tools for creating one of a plurality of types of products created in the manufacturing environment;
configuring operation of the manufacturing environment to optimize at least one of: consumption of the set of resources or generation of the set of exhaust materials during the creation of desired quantities of the plurality of types of products within a desired time frame using the operating data, wherein the configuring includes evaluating a cost of a recipe for manufacturing a type of product by consolidating the actual resource consumption data and the actual exhaust generation data for the plurality of recipe steams in the recipe; and
generating a manufacturing schedule based on the optimized operation of the manufacturing environment and at least one of a desired quantity of a product to be manufactured in the manufacturing environment in a time frame, and an availability of each tool in the plurality of tools that performs a portion of the recipe for the product.

19. The method of claim 18, wherein the acquiring includes:
acquiring the actual resource consumption data and exhaust generation data from an equipment trace acquired by a tool management system for the corresponding tool; and
correlating the actual resource consumption data and exhaust generation data with recipe step data stored on a manufacturing execution system for the manufacturing environment, the recipe step data corresponding to a recipe step for a type of product.

20. The method of claim 18, further comprising evaluating an environmental impact corresponding to the manufacturing of a type of product by consolidating the actual resource consumption data and exhaust generation data for the plurality of recipe steps in the recipe.

* * * * *